Figure 1:
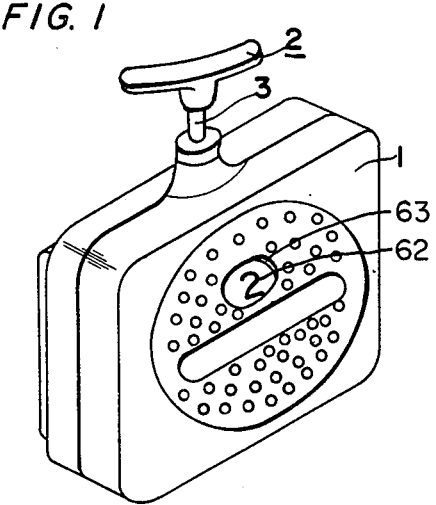

United States Patent [19]

Nakabayashi et al.

[11] 3,987,494

[45] Oct. 19, 1976

[54] PORTABLE MAGNETIC TAPE PLAYER WITH HANDLE CONSTITUTING MAGNETIC TAPE HEAD INDEXING MECHANISM

[75] Inventors: Kenji Nakabayashi, Neyagawa; Teruo Kittaka, Osaka; Yotaro Yamauchi, Moriguchi, all of Japan

[73] Assignee: Matsushita Electric Industrial Co., Ltd., Osaka, Japan

[22] Filed: Feb. 4, 1975

[21] Appl. No.: 547,087

[30] Foreign Application Priority Data
Feb. 4, 1974 Japan............................ 49-15031[u]
Feb. 4, 1974 Japan............................ 49-15032[u]

[52] U.S. Cl.................................. 360/106; 360/137
[51] Int. Cl.²...................... G11B 5/55; G11B 21/08; G11B 1/00

[58] Field of Search...................... 360/106, 78, 137

[56] References Cited
UNITED STATES PATENTS

| | | | |
|---|---|---|---|
| 2,430,538 | 11/1947 | Somers | 360/78 |
| 3,538,779 | 11/1970 | Yamamoto | 360/106 |
| 3,582,965 | 6/1971 | De Metrick | 360/137 |
| 3,833,923 | 9/1974 | Camras et al. | 360/106 |

*Primary Examiner*—Robert S. Tupper
*Attorney, Agent, or Firm*—Wenderoth, Lind & Ponack

[57] ABSTRACT

There is disclosed a portable magnetic tape player having a handle for transporting thereof. The handle is operatively coupled to an indexing mechanism for selectively causing a magnetic tape recording and/or reproducing head to align with any one of tracks of a magnetic tape.

2 Claims, 5 Drawing Figures

PORTABLE MAGNETIC TAPE PLAYER WITH HANDLE CONSTITUTING MAGNETIC TAPE HEAD INDEXING MECHANISM

The present invention relates to an indexing mechanism for a magnetic tape recording and/or reproducing head and, more particularly, to a head indexing mechanism operable by a handle for support of a magnetic tape player by hand during transportation of such player, which handle also serves as an actuator for operating the indexing mechanism.

Various models of portable magnetic tape players are being placed on the market and, therefore, are commercially available. The presently commercially available magnetic tape players of a type utilizing, for example, a cartridge containing therein a multi-track magnetic tape, have a handle for transportation thereof and include an actuator, in the form of a push button or a pivotable lever or knob, for operating the head indexing mechanism to change a selected one of the recording or reproducing tracks of the tape. Since the handle and the actuator are in separate and independent relation to each other, the conventional model of a magnetic tape recording and/or reproducing player is inconvenient to operate in that ready start of operation of the player and, more particularly, ready selection of any of the tracks of the tape, cannot be effected immediately after the player has completely been transported from one location to another. Moreover, in a case where selection of any of the tape tracks during transportation of the player is desired, the conventional player cannot readily accommodate the desire of the user or operator.

Accordingly, an essential object of the present invention is to provide a portable magnetic tape player having a handle for transportation thereof, which handle also serves as an actuator for operating an indexing mechanism to change a selected one of tracks of a magnetic tape accommodated in a container, for example, a casette or a cartridge.

Another object of the present invention is to provide a portable magnetic tape player which is compact and can readily be operated, if a power supply switch is operatively associated with movement of the handle, while change of the tracks of the magnetic tape is simultaneously effected.

A further object of the present invention is to provide a portable magnetic tape player which provides a pleasing appearance and is comfortable to hold for transportation, without incurring any substantial increase in the manufacturing cost as compared with any of the conventional players of a similar kind.

Figure 2:
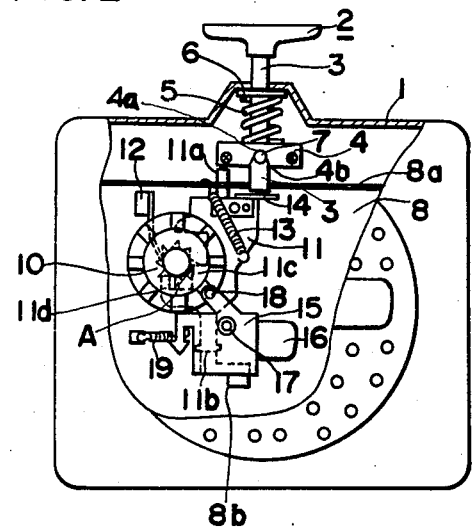
Figure 4:
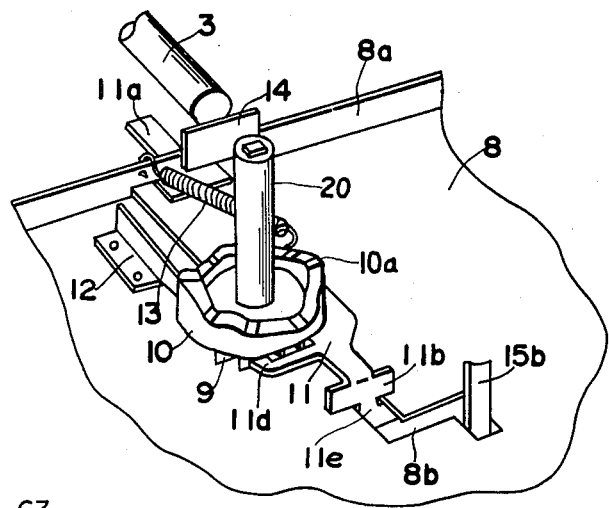
Figure 3:
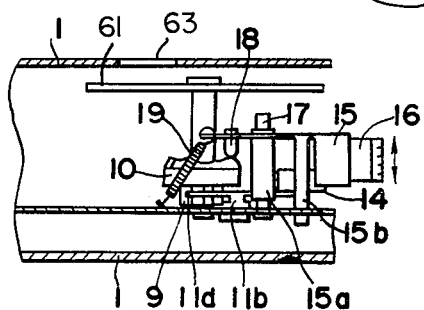
Figure 5:
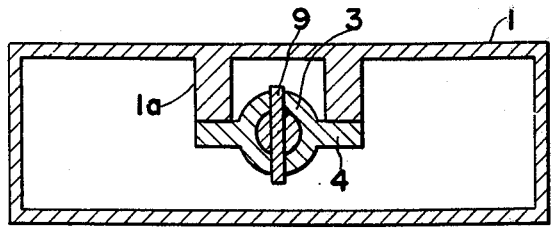

These and other objects and features of the present invention will become apparent from the following description taken in conjunction with a preferred embodiment thereof with reference to the accompanying drawings, in which:

FIG. 1 is a schematic perspective view of a magnetic tape player embodying the present invention, showing the appearance of the outside thereof, FIG. 2 is a schematic front view of the magnetic tape player of FIG. 1, with a portion broken away to show a magnetic head indexing mechanism, FIG. 3 is a schematic side sectional view of an essential portion of the magnetic head indexing mechanism shown in FIG. 2, FIG. 4 is a schematic perspective view, on an enlarged scale, of the essential portion of the magnetic head indexing mechanism shown in FIG. 3, and FIG. 5 is a schematic sectional view, on an enlarged scale, of a portion of a handle as viewed in a direction perpendicular to the longitudinal axis of a handle rod.

Referring now to FIGS. 1 to 4, a portable magnetic tape player comprises a housing structure 1 in which all necessary operating elements, both electrical and mechanical, are accommodated in any known manner. An indexing mechanism for selectively positioning a magnetic tape head 16 to different tracks of a magnetic tape (not shown) contained in a container (not shown), for example, either a cartridge or a casette, is also operatively housed within the housing structure 1 and includes a head mounting 15 carrying the magnetic head 16 as best shown in FIG. 3. The head mounting 15 is supported on a chassis 8 for reciprocal stepwise movement in a direction perpendicular to the direction of travel of the magnetic tape or the lengthwise direction of the magnetic tape by means of a guide sleeve 15a axially movably mounted on a guide rod 17 which projects from the chassis 8 at right angles to the plane of said chassis 8, one end of which guide sleeve 15a is rigidly secured to the head mounting 15.

The head mounting 15 has a leg 15b integrally formed therewith, which leg 15b, as viewed from FIG. 3, downwardly extends into a shaped slot 8b formed in the chassis 8, so that arbitrary rotation of the head mounting 15 about the axis of the guide rod 17 can be avoided. The head mounting 15 is normally biased by a tension spring 19, suspended between it and the chassis 8, whereby a follower pin 18 rigidly carried by said head mounting 15 is constantly held in contact with a stepped surface 10a on a cam wheel 10. The number of steps on the stepped surface 10a of the cam wheel 10 corresponds to the number of the tracks of the magnetic tape to be played by the player.

The cam wheel has a ratchet wheel 9 coaxial with said cam wheel 20, which ratchet wheel 9 may be integrally formed with said cam wheel 10. Both cam wheel 10 and ratchet wheel 9 are supported on a shaft 10 for rotation together with said shaft 20, said shaft 20 being journalled at both ends thereof to two spaced members of the chassis 8.

In the construction so far described, it will readily be seen that rotation of the cam wheel 10, which is effected in a manner as will be described later, causes the head mounting 15 to move in a direction parallel to the axis of the guide rod 17. Therefore, it will also readily be seen that, depending upon positioning of the follower pin 18 relative to the steps on the stepped surface 10a of the cam wheel 10, the magnetic head 16 can be aligned with the respective tracks of the magnetic tape as desired.

Mounted on the opposite end of shaft 20 from cam wheel 10 adjacent a side wall of housing 1 is an indicia wheel 61 having indicators 62 thereon corresponding to the number of positions of the tape head 16. The wheel 61 will rotate each time the cam 10 rotates to expose an indicator 62 through a window 63 in housing 1.

The ratchet wheel 9 has gear teeth A equal in number to the number of the steps on the stepped surface 10a of the cam wheel 10 which in turn is the same as the number of the tracks of the magnetic tape.

The indexing mechanism further includes an operating plate member 11 which extends between the chassis 8 and the cam wheel 10, the lower end, as viewed from FIG. 2, of said plate member being bent and shaped into substantially an H-shape. The H-shaped end 11b of the plate member 11 is so sized that a portion at 11e corresponding to the crossbar of the H-shape has a width smaller than the width of the slot 8b and a length slightly greater than the thickness of the chassis 8 and, particularly, the portion of the chassis 8 adjacent the slot 8b. The plate member 11 is loosely supported by the chassis 8 with the H-shaped of lower end 11b accommodating the thickness of the chassis 8, so that the plate member 11 is pivotable about the lower end thereof and also movable in a direction substantially perpendicular to the axis of the shaft 20.

The operating plate member 11 has a step formed at a substantially intermediate portion thereof as at 11c, which step 11c is selectively engageable into the tooth grooves of the ratchet wheel 9, each of said tooth grooves being defined by a pair of adjacent teeth A of said ratchet wheel 9. The operating plate member 11 also has a pawl integrally formed as at 11d on said plate member 11, said pawl 11d being spaced from the step 11c at a certain angle with respect to the axis of rotation of the ratchet wheel 9, that is, the shaft 20. Secured to the chassis 8 and downwardly extending, as viewed in FIG. 2, into any one of the tooth grooves of the ratchet wheel 9 is a leaf spring 12 and biased by the effect of its own resiliency, which leaf spring 12 acts as a pawl in cooperation with the pawl 11d of the plate member 11 to avoid reverse rotation of the ratchet wheel 9 and the cam wheel 10 with respect to the rotational direction thereof which is otherwise effected by the movement of the plate member 11 as will now be described.

It is to be noted that either the leaf spring 12 or the pawl 11d may be omitted. However, the employment of the pawl 11d and the leaf spring 12 is advantageous in that any fine rotation of the ratchet wheel 9, which may otherwise occur due to a play of the pawl 11d or the tip of the leaf spring 12 within one of the tooth grooves of the ratchet wheel 9, can be avoided.

The other end, that is, the upper end as viewed in FIG. 2, of the plate member 11 is provided with a guide lever 11a, which may be integrally formed therewith and which, as viewed from FIG. 2, extends upwardly through a guide slot of a length greater than the width of the guide lever 11a, said guide slot being formed in a flange 8a which extends from the chassis 8 at right angles thereto. The plate member 11 carries at a portion adjacent the upper end thereof an abutment 14, which may be integrally formed with said plate member 11, but in the preferred embodiment shown is in the form of a leaf spring secured to the upper end of said plate member 11. It is to be noted that the length of the guide lever 11a should be greater than the stroke of movement of the operating plate member 11.

The operating plate member 11 having the construction as hereinbefore described is, as viewed from FIG. 2, upwardly and counterclockwisely biased by a tension spring 13 suspended between said plate member 11 and said flange 8a of the chassis and extending in a direction at an angle relative to the direction of linear movement of said plate member.

A handle for carriage or transportation of the magnetic tape player comprises a grip 2 of substantially T-shaped configuration and a rod 3 having one end rigidly secured to said grip 2. Alternatively, the grip 2 and the rod 3 may be integrally formed with each other.

The other end of rod 3, terminates adjacent the leaf spring abutment 14 within the housing structure 1 while the intermediate portion of said rod 3 slidable extends through an upper wall portion of the housing structure. Within the housing structure 1, for axially movably and rotatably supporting the rod 3, a sleeve 4 having a pair of wing-like projections 4a is secured to the rear panel of the housing structure with said projections 4a fastened by means of set screws to corresponding spacers 1a projecting from said rear panel of said housing structure 1. It is to be noted that the rear panel of the housing structure 1 extends in substantially parallel relation to the chassis 1. The cross sectional shape of the sleeve 4 is best shown in FIG. 5.

Between the sleeve 4 and the upper wall portion of the housing structure 1, there is provided a compression spring 5 whereby the handle is constantly upwardly urged. In the case where contact between the upper wall portion of the housing structure 1 and one end of the compression spring 5 is undesirable, a stop 6 may be rigidly mounted on the rod 3 within the housing structure 1.

In the construction so far described, as the handle 2 is pushed down to push the rod 3 axially downwardly against the force of the compression spring 5, the operating plate member 11 is moved downwardly with the free end of said rod 3 pressing the leaf spring abutment 14. As the operating plate member 11 is thus moved against the tension spring 13, the step 11c of said plate 11 slides over one of the teeth A of the ratchet wheel 9 and is thereafter brought into position ready to engage in the next tooth groove because of said plate 11 being biased substantially about the lower end thereof by the action of said tension spring 13. Release of the axial pushing force, that has been applied to the handle to depress the latter causes the rod 3 to move due to the force exerted by the compression spring 5 and simultaneously therewith, the plate member 11 is also moved due to being pulled by the tension spring 13.

As the plate member 11 is thus upwardly moved while being pulled by the tension spring 13, the step 11c of said plate member 11 engages deep into the tooth groove of the ratchet wheel 9 and further upward movement of said plate member 11 causes said step 11c to shift the tooth A of said ratchet wheel 9 to rotate the latter and, hence, the cam wheel 10. As hereinbefore described, stepwise rotation of the cam wheel 10 results in shift of the magnetic head 16 in the direction perpendicular to the direction of travel of the magnetic tape.

In the arrangement of the handle so far described, there may be a possibility that the handle is erroneously depressed. To avoid this, the compression spring 5 may be of a type capable of exerting a relatively great axial force. However, the use of the compression spring of relatively great axial force would result in requirement for a relatively great pushing force to be applied to the handle to depress the latter, which is undesirable.

Therefore, according to another feature of the present invention, the sleeve 4 has a pair of 180° spaced detent notches 4a, only one of which is shown in FIG. 2, each of said detent notches 4a having a root portion which diverges towards the spring abutment 14 to provide opposed inclined surfaces 4b. A pin 7 extends through the rod 3 with both ends projecting therefrom in the opposite directions with respect to each other and, so long as the handle is upwardly biased by the compression spring 5, the ends of rod 3 are engaged in said detent notches 4a.

Assuming that the compression spring 5 is of a type capable of exerting a relatively great axial force, the downward movement of the rod 3 can easily be carried out by rotating the grip 2. In other words, when a substantially slight axial force is applied to the grip 2 until the ends of the pin 7 substantially escape from the respective detent notches 4a and, then, a rotary force is applied to said grip while the the axial pushing force is still being exerted, the ends of the pin 7 commence to slide over the respective inclined surfaces 4b and at the same time the free ends of said rod 3 pushe the abutment 14 to cause the plate member 11 to move downwardly against the action of the tension spring 13. It is to be noted that the depth of each of the detent notches 4a is substantially equal to or slightly greater than the stroke of movement of the plate member 11 plus the size of any play provided between the free end of the rod 3 and the spring abutment 14 so that, when the axial and rotary pushing force applied to the handle is removed at the time of completion of the downward movement of the plate member 11, the handle returns to the original position with the rod 3 axially upwardly biased and concurrently rotated about its own axis.

From the foregoing, it is clear that the handle undergos an axial and a rotary motion, and only a relatively slight pushing and rotating force is necessary even though the compression spring 5 exerts a relatively great axially acting force which is required to prevent the handle from being erroneously depressed.

Although the present invention has been fully described by way of example, it is to be noted that various changes and modifications will be apparent to those skilled in the art and, therefore, unless they depart therefrom, they should be construed as being included within the scope of the present invention.

What is claimed is:

1. A magnetic recording and reproducing device comprising a housing, a recording and reproducing head in said housing movable transversely to the path of a magnetic tape through said housing for shifting from a position corresponding to one track to a position corresponding to another track on said tape, track selecting means coupled to said recording and reproducing head for shifting said head between said positions, said housing having a window therein a display means having indicators thereon corresponding to the tracks on the tape and coupled to said track selecting means and being positioned adjacent said window for displaying an indicator corresponding to the position of the head opposite a particular track on the tape in response to shifting of the head by said track selecting means, a handle means having a guide mounted within said housing and a slidable rod slidable through said guide for movement toward and away from said housing and operatively associated with said track selecting means for shifting said head in response to movement of said handle in one direction relative to said housing, said handle means serving as a grip for the hand of an operator of the device for carrying the device from place to place, said handle means further having a rotation preventing pin member adjacent the end of said rod within said housing, said guide means and having a recess therein opening in a direction toward the direction in which the rod moves into the housing and in which said pin member is engaged when the rod is in one rotational position around its axis, said recess having the portion opening out of the guide larger than the diameter of said pin member and the bottom of the recess of a size smaller than the diameter of said pin member, means engaging said handle means for normally locking said handle means in a locked position with said pin member in said recess for preventing the rod from being moved relative to the housing and thereby preventing track changing, whereby when a rotational movement of a value in excess of a predetermined value is applied between said handle and said casing, said pin disengages from said recess by sliding over the surface of the recess, thereby releasing said handle from the locked position.

2. A magnetic recording and reproducing device as claimed in claim 1 in which said track selecting means comprises a shaft rotated by the movement of said handle in one direction relative to said housing, a cam on said shaft engaged with said magnetic head for shifting said head, and said display means comprising a disk on the shaft, the indicators thereon being correlated to the relative position of the head as moved by the cam on the shaft.

* * * * *